(12) United States Patent
Trossen et al.

(10) Patent No.: US 7,054,643 B2
(45) Date of Patent: *May 30, 2006

(54) SYSTEM FOR RATE CONTROL OF MULTICAST DATA DELIVERY IN A WIRELESS NETWORK

(75) Inventors: Dirk Trossen, Cambridge, MA (US); Hemant M. Chaskar, Woburn, MA (US)

(73) Assignee: Nokia Corporation, Espoo (FI)

( * ) Notice: Subject to any disclaimer, the term of this patent is extended or adjusted under 35 U.S.C. 154(b) by 554 days.

This patent is subject to a terminal disclaimer.

(21) Appl. No.: 10/079,338

(22) Filed: Feb. 20, 2002

(65) Prior Publication Data

US 2003/0157899 A1    Aug. 21, 2003

(51) Int. Cl.
*H04Q 7/20* (2006.01)
(52) U.S. Cl. ............ 455/454; 455/450; 455/509; 455/517; 370/232; 370/233; 709/231; 709/246
(58) Field of Classification Search ........ 370/232, 370/233; 709/246, 231, 233; 455/450, 451, 455/457.1, 452.2, 517, 509, 422.1, 426, 519, 455/405, 454, 445
See application file for complete search history.

(56) References Cited

U.S. PATENT DOCUMENTS

| | | | |
|---|---|---|---|
| 5,504,939 A * | 4/1996 | Mayrand et al. ............ 455/450 |
| 5,745,837 A | 4/1998 | Fuhrmann | |
| 6,104,709 A | 8/2000 | Rinchiuso et al. | |
| 6,215,766 B1 | 4/2001 | Ammar et al. | |
| 6,233,017 B1 | 5/2001 | Chaddha | |
| 6,360,076 B1 * | 3/2002 | Segura et al. ............ 455/67.11 |
| 6,473,858 B1 | 10/2002 | Shimomura et al. | |
| 6,532,562 B1 | 3/2003 | Chou et al. | |
| 6,553,568 B1 | 4/2003 | Fijolek et al. | |
| 6,556,659 B1 | 4/2003 | Bowman-Amuah | |
| 6,865,167 B1 * | 3/2005 | Famolari et al. ............ 370/331 |
| 2003/0037160 A1 * | 2/2003 | Wall et al. .................. 709/233 |

* cited by examiner

OTHER PUBLICATIONS

PCT International Search Report, International Application No. PCT/IB03/00588.
3GPP2 Technical Contribution P00-20011105, "CDMA2000 Broadcast/Multicast Services Stage 2; Higher Layer Design, Version 0.01," Nov. 5-9, 2001.
Trossen, et al., U.S. Appl. No. 10/079,373, "Rate Allocation and Control for Multicast Services in Wireless Networks," filed Feb. 20, 2002.

*Primary Examiner*—Lee Nguyen
*Assistant Examiner*—Sanh Phu
(74) *Attorney, Agent, or Firm*—Banner & Witcoff, Ltd.

(57) ABSTRACT

The present invention provides methods and apparatus for transmitting multicast data over a wireless channel. At least one wireless terminal requests a multicast service corresponding to at least one requested layer. A wireless infrastructure comprising a base station and a node determines a data rate that the at least one wireless terminal can receive reliably and correspondingly configures a multicast session for at least one layer. The node utilizes measurements provided by the wireless terminal. The node through the base station signals the wireless terminal about a link-level multicast address corresponding to a time slot for which the wireless terminal shall process packets. An associated point of attachment with a core data network controls a data flow from a multicast content source through the core data network in order to match the data rate over the wireless channel.

14 Claims, 14 Drawing Sheets

SYSTEM FOR RATE CONTROL OF MULTICAST DATA DELIVERY IN A WIRELESS NETWORK

FIELD OF THE INVENTION

The present invention relates to providing multicast services in a wireless communications system.

BACKGROUND OF THE INVENTION

Multimedia streaming is considered to be a major evolving Internet application since it aims at replacing widely known television applications such as video-on-demand, pay-per-view, or video broadcast. Currently, a number of portal sites offer Internet protocol (IP) multicast services to be extended using wireless transmission to wireless terminals. With such a service, a wireless system broadcasts data packets to a plurality of wireless terminals. Each wireless terminal receives and processes the same stream of packets. Using multicast transmission rather than a plurality of unicast transmissions is substantially more spectrum efficient providing that the services are amenable to broadcasting to the plurality of wireless terminals. Because frequency spectrum for wireless services is very limited and very expensive to expand, the utilization of multicast services is very appealing to wireless service providers.

An example of a multicast service is IP multicast streaming for news and entertainment content in audio and video formats. As the data rate of wireless channels continues to increase and as the wireless channels are becoming optimized for IP packet transfers as with cdma2000 1.25 MHz Evolution (1xEV) 3GPP2 wireless standards, an increasing number of wireless customers will have access to multicast services. If the service were provided with a dedicated communications link between a base station and each wireless terminal in the same geographical area (corresponding to a cell that is served by the base station), the frequency spectrum usage essentially increases proportionally to the number of wireless terminals that subscribe to the service. This approach is not efficient in that data transmission is duplicated for the participating wireless terminals. Multicast services broadcast the data stream to all the participating wireless terminals on the wireless downlink (base station to wireless terminals), eliminating the duplication of data transmission and thus improving the frequency spectrum efficiency of the wireless channels.

Typically, multicast services are inherently unidirectional from the wireless base station to the wireless terminal. As an example, a video service may require a transmission rate of several hundred thousand bits per second in the forward direction and several hundred bits per second in the reverse direction in order to support signaling. Because of the pronounced asymmetry of transmission, the quality of the received signal at the wireless terminal is an important parameter in supporting multicast services. In the prior art, substantial time delays are incurred with having rate control functionality at the wireless terminal rather than the wireless infrastructure and the IP core network. With dynamic radio conditions that are typical with wireless communications, these delays can result in data transmission loss resulting in a degradation of services. Reducing associated delays will improve the quality of multicast services that are provided by wireless communications systems.

BRIEF SUMMARY OF THE INVENTION

The present invention provides methods and apparatus for transmitting multicast content over a wireless channel. At least one wireless terminal requests a multicast service that may comprise a number of layers. A wireless infrastructure comprising a base station and a node determines a data rate that the at least one wireless terminal can receive reliably and correspondingly configures a multicast session for at least one layer. The node utilizes measurements provided by the wireless terminal. The node through the base station signals the wireless terminal about a link-level multicast address corresponding to a time slot for which the wireless terminal shall process packets. An associated point of attachment with a core data network controls a data flow from a multicast content source through the core data network in order to match the data rate over the wireless channel.

In an exemplary embodiment of the invention, a wireless communications system comprises a plurality of wireless terminals, a base station, a node, an Internet protocol (IP) peer, and an IP core network. The exemplary embodiment utilizes signaling between a wireless terminal to an IP peer through a serving base station for requesting subscription to a multicast group corresponding to a multicast service. The wireless terminal can be one of a plurality of wireless terminals that is receiving the multicast service. In the exemplary embodiment, the wireless terminal also sends bandwidth requirements for each layer (corresponding to a multicast group address). In a variation of the exemplary embodiment, the IP peer supports a data structure that associates the bandwidth requirement with each layer of the multicast service. The wireless terminal also notifies the node about a signal to noise ratio (SNR) measurement. The node consequently schedules packets for each layer on the wireless channel and notifies the IP peer about the transmitted layers to the wireless terminal. The IP peer adjusts the packet flow through the IP core network in order to adapt to the number of layers that is being transmitted over the wireless channel to the plurality of wireless terminals.

In another embodiment of the invention, a wireless communications system combines the functionality of a node and an IP peer into a base station. The incorporation of an IP router facilitates an all-IP network for wireless multicast services.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
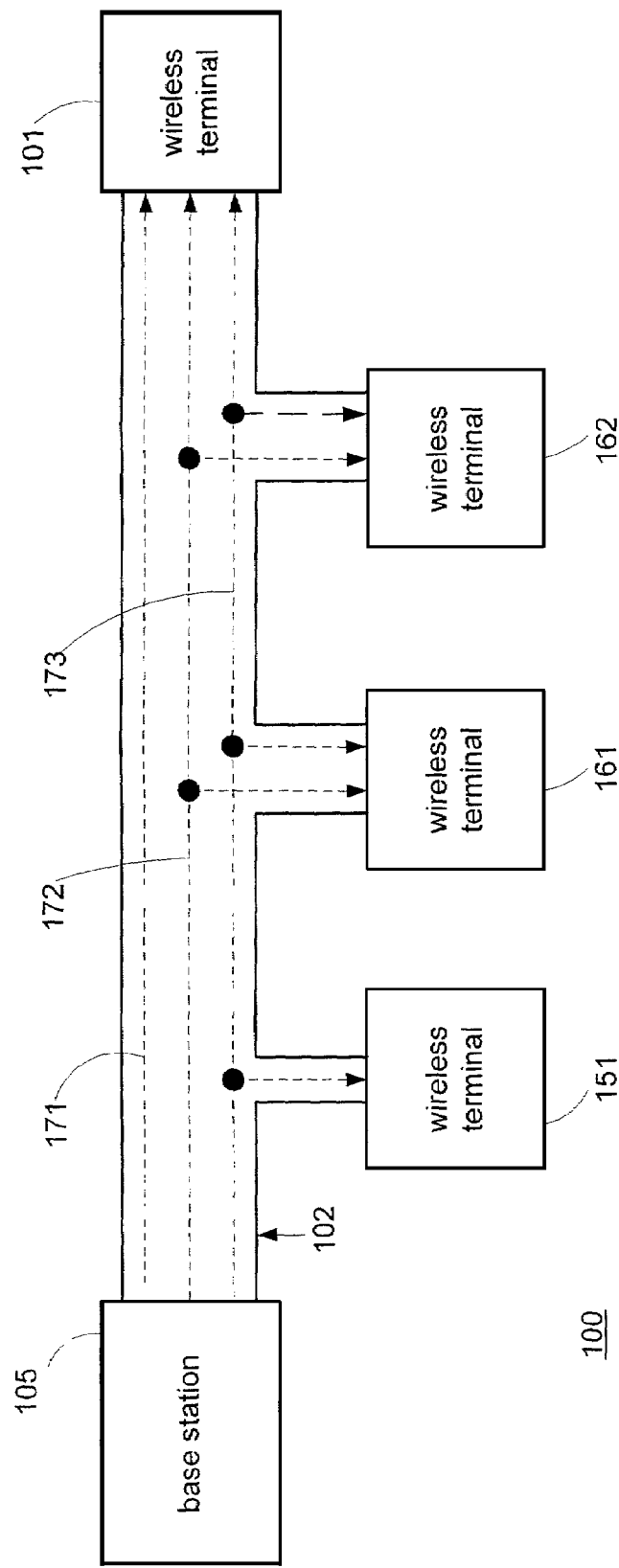
FIG. 1 represents a configuration of a wireless communications system that supports a multicast service in accordance with an embodiment of the invention.

FIG. 1 shows a configuration of a wireless channel 102 that supports a multicast service, as provided by a wireless system 100, from a base station 105 to a plurality of wireless terminals including wireless terminals 101, 151, 161, and 162 in accordance with an embodiment of the invention. As an example, the multicast service provides a performance of the Rolling Stones. The transmission of the performance includes an audio component and two video components. The first component supports slow motion (low resolution) video, and the second video component, in combination with the first video component, supports fast motion (higher resolution) video. The embodiment supports synchronization of layers with each other. In the embodiment, each layer comprises a time stamp so that wireless terminals 101, 151, 161, and 162 can synchronize the layers that constitute the performance. Alternative embodiments may utilize other approaches for synchronization, including inserting synchronization sequences within each layer. Moreover, with an alternative embodiment a separate layer for each video component may be utilized so that layers do not need to be combined.

Wireless channel 102 transports data in the forward direction (base station to wireless terminal) and the reverse direction (wireless terminal to base station). Typically, for a multicast service, a data rate on the forward direction is substantially greater than a data rate on the reverse direction. In the example, wireless communications channel 102 has sufficient bandwidth to transport a data stream with the audio component and both video components. However, a wireless terminal (as requested by a user) may not wish to totally experience the broadcast. Also, the wireless terminal may not have the capability of processing the entire data stream because the wireless terminal lacks a display capability (e.g. does not have a video display). Moreover, the wireless propagation characteristics may be restricted, thus limiting the corresponding data rate that the wireless terminal can reliably receive. Rate control for multicast services addresses this factor.

In the embodiment, wireless terminals 101, 151, 161, and 162 report corresponding measurements that are indicative of the wireless propagation characteristics by signaling base station 105 in the reverse direction of wireless channel 102. Wireless system 100 adjusts the configuration of wireless channel 102 in accordance with the measurements.

In the example, wireless channel 102 is logically partitioned into subchannels 171, 172, and 173 in which each subchannel transports a component of the multicast presentation. A subchannel is a logical or physical portion of wireless channel 102. The subchannel corresponds to a subset of the total data throughput of wireless channel 102. In the example shown in FIG. 1, 171, 172, and 173 are layers that are An address can be associated with one or more layers. Conversely, a layer can be associated with one or more addresses.) Layer 173 corresponds to the audio component, layer 172 corresponds to the first video component, and layer 171 corresponds to the second video component. Wireless terminal 101 processes all layers (audio layer 173 and both video layers 171 and 172). Thus, wireless terminal 101 displays fast motion video and plays the music of the Rolling Stone's performance. Wireless terminals 161 and 162 process only layers 172 and 173, and thus display only the slow scan motion video and play the music. With a multicast service, a plurality of wireless terminals can be grouped together so that the plurality of wireless terminals receive the same layers of the multicast transmission as is the case for wireless terminals 161 and 162 in the example. Wireless terminal 151 processes only layer 173, and thus only plays the music.

Even though FIG. 1 depicts four wireless terminals (101, 151, 161, and 162) receiving the multicast transmission, a multicast service can support from one to many wireless terminals.

Figure 2:
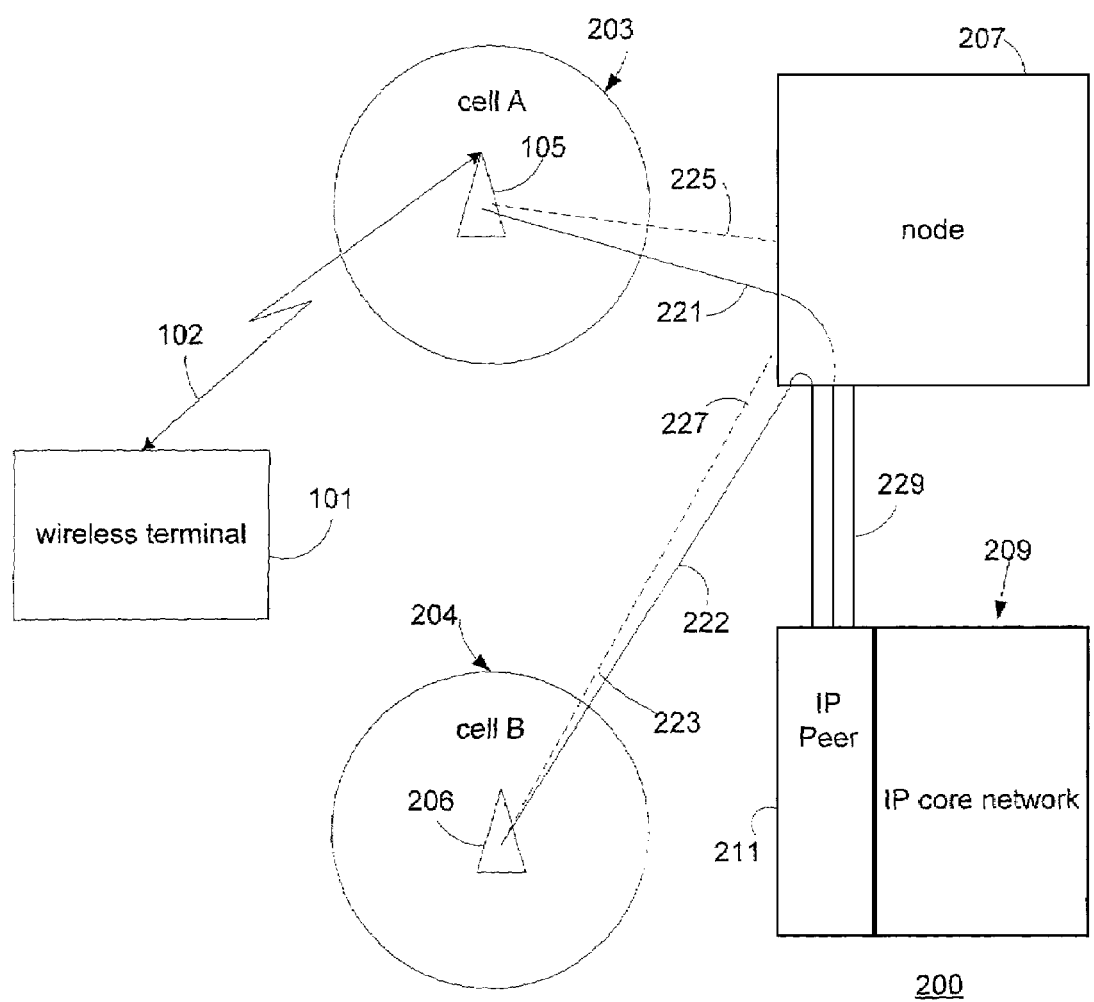
FIG. 2 shows an architecture of a wireless communications system in accordance with an embodiment of the present invention.

FIG. 2 shows an architecture of a wireless communications system 200 in accordance with an embodiment of the present invention. Wireless communications system 200 comprises wireless terminal 101, base station 105 that serves a cell 203, a base station 206 that serves a cell 204, a node 207, and an Internet protocol (IP) core network 209. IP core network 209 comprises an IP peer 211, which is an IP point of attachment of wireless terminal 101 with the Internet as provided by an IP core network 209. Even though the exemplary embodiment utilizes IP as the network layer, other embodiments of the invention can support other network layer protocols.

In FIG. 2, wireless terminal 101 is being served by base station 105 over a wireless channel 102. Base station 105 comprises a radio transmitter and a radio receiver in order that base station 105 can communicate with wireless terminal 101 over wireless channel 102. If wireless terminal 101 moves toward cell 204, which is the serving region supported by base station 206, base station 206 may commence serving wireless terminal 101.

With multicast services, the data rate on the downlink (forward direction) is substantially greater than the data rate on the uplink (reverse direction). The source of the multicast service comprises a stream of IP packets that are transported through IP core network 209, IP peer 211, an IP link 221, base station 105, and wireless channel 102. If wireless terminal 101 is served by base station 206, a data link 222 is utilized rather than data link 221 for transporting IP packets. In the exemplary embodiment, data links 221 and 222 are routed through node 207.

Node 207 acts as a layer 2 bridge between wireless terminal 101 and IP peer 211. (Layer 2 is the link layer in accordance with the Open Systems Interconnection (OSI) reference model. As a point of clarification, the term "layers" in reference to the OSI model is not the same as the term "layers" in reference to the transmission of multicast content.) Node 207 may have control functions as well as data plane functions. In some embodiments, node 207 can be implemented with a base station controller. Wireless terminal 101 periodically reports a measured signal to noise ratio (SNR) or similar quality measure using signaling messages from wireless terminal 101 to base station 105 over wireless channel 102 in the reverse direction at a low data rate. The SNR measurements are forwarded from base station 105 to node 207 over data link 225. If wireless terminal 101 is served by base station 206, then the corresponding SNR information is carried over a data link 227 to node 207. Node 207, as shown in FIG. 2, is logically separated from base station 105. However, node 207 may be physically associated with any base station (e.g. base stations 105 and 206).

Figure 3:
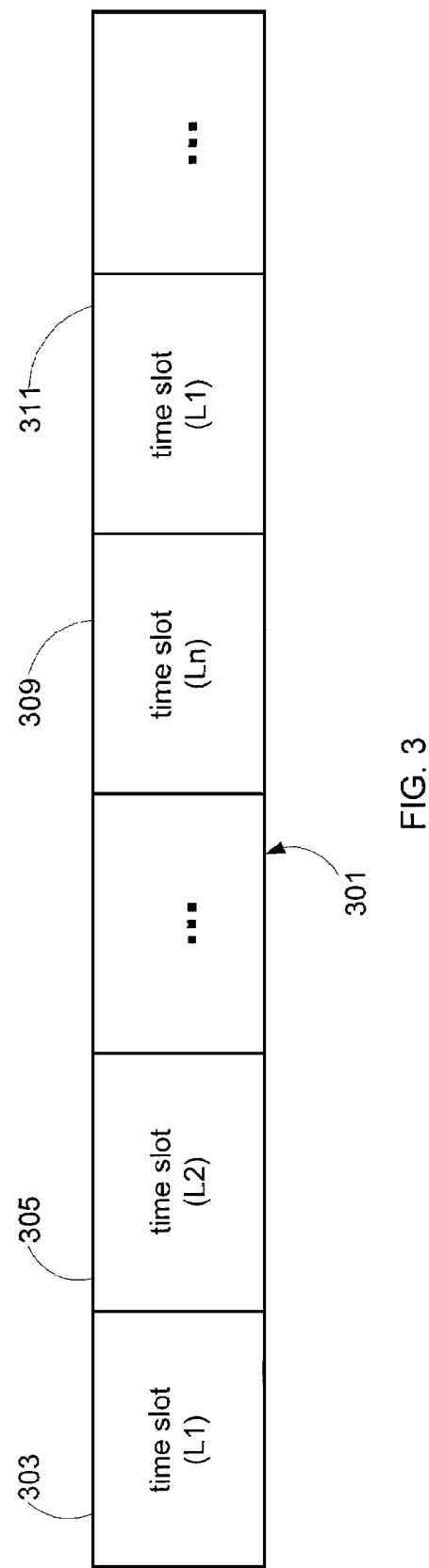
FIG. 3 shows a transmission diagram for multicast services in accordance with an embodiment of the present invention.

Node 207 converts an SNR measurement or a similar quality measure to a corresponding maximum data rate that wireless terminal 101 can support over wireless channel 102. Typically, the determination of the data rate for a time slot (as illustrated in FIG. 3) is based upon a desired packet error rate (PER). In the exemplary embodiment, the targeted PER is 1% as shown in Table 1. Table 1 corresponds to cdma2000 1X-EV-DO (1.25 MHz carrier-EVolution-Data Only) systems. In Table 1, the SNR measurement corresponds to $E_c/N_t$, which is the ratio of energy per chip to the noise energy. (A "chip" is a fundamental pulse of a spread spectrum signal.) As an example, with an SNR ratio of $E_c/N_t=-4.0$ dB, the corresponding maximum data rate on the downlink with a packet error rate of 1% is approximately 307 kb/s. Different data rates may invoke different modulation and coding schemes. Other ratios may be used to represent the SNR such as $E_b/N_o$ (where $E_b$ is the energy per bit and $N_o$ is the associated energy noise level) and S/N (where S is the measured power of the received signal and N is the associated noise power).

TABLE 1

Data rate associated with SNR measurement (corresponding to 1% PER)

| Data Rate (kb/s) | $E_c/N_t$ (dB) |
|---|---|
| 38.4 | −12.5 |
| 76.8 | −9.5 |
| 102.6 | −8.5 |
| 153.6 | −6.5 |
| 204.8 | −5.7 |
| 307.2 | −4.0 |
| 614.4 | −1.0 |
| 921.6 | 1.3 |
| 1228.8 | 3.0 |
| 1843.2 | 7.2 |
| 2457.6 | 9.5 |

With a variation of the exemplary embodiment, wireless terminal 101 may be associated with a quality of service (QoS) level in which the target PER is different than 1%, and thus may correspond to different values that are shown in Table 1. Different QoS levels can be assigned to different wireless terminals. (For example, a first QoS level may correspond to a target PER of 0.5%, and a second QoS level may correspond to a target PER of 1.0%.) In such a case, a corresponding maximum data rate to SNR mapping may be required.

With multicast services, wireless communications system 200 can simultaneously support a plurality of wireless terminals, each wireless terminal experiencing different radio propagation conditions as measured by the SNR. For example, at a given instant of time, wireless terminal 101 may measure SNR as −3.0 dB (which is between table entries for −1.0 dB and for −4.0 dB and thus corresponds to approximately 307.2 kb/s) while another wireless terminal may measure SNR as −10.0 dB (corresponding to approximately 38.4 kb/s). In such a case, wireless terminal 101 could process a signal at a data rate of 38.4 kb/s, but the other wireless terminal could not process a signal at a data rate of 307.2 kb/s. Because node 207 has SNR measurements about each of the plurality of wireless terminals, node 207 can group the plurality of wireless terminals in order to efficiently utilize the available frequency spectrum for multicast services. The example shown in FIG. 1 illustrates the grouping of wireless terminals. If wireless terminals 161 and 162 have approximately equal SNR measurements, terminals 161 and 162 can be grouped together in order to receive the same multicast layers (e.g. layers 172 and 173 in FIG. 1).

As can be appreciated by one skilled in the art, variations of the exemplary embodiment can support other variations of spread spectrum technology, including cdma2000 1X-EV-DV (1.25 MHz carrier-EVolution-Data and Voice) Standards and Universal Mobile Telecommunications System (UMTS) Standards.

FIG. 3 shows a transmission diagram for multicast services in accordance with an embodiment of the present invention. A packet stream 301 comprises time slots 303, 305, 309, and 311 each having a time duration of approximately 1.67 ms. The data rate that is associated with a time slot is determined by SNR measurements as discussed in relation to Table 1. Time slots can be associated with different link-level multicast addresses (multicast group addresses). Time slots 303, 305, and 309 correspond to link-level multicast addresses $L_1$, $L_2$, and $L_n$, respectively. (Each time slot can transport one or more multicast layers.) In the exemplary embodiment, the addresses for time slots repeat every N time slots, and the time slots are of equal time duration. However, with other variations of the embodiment, time slots may not have the same time duration, and the link-level multicast addresses may not occur in a regular pattern in order to support required transmission rates for a multicast service. Also, adjacent time slots may have the same link-level multicast address. Each wireless terminal (e.g. wireless terminal 101) is notified of the assigned link-level multicast addresses through signaling messages over a wireless channel (e.g. channel 102). Wireless system 200 can notify wireless terminal 101 about the association of each time slot to a link-level multicast address either through in-band signaling (explicitly including the link-level multicast address in a particular data field of each time slot) or through out-of-band signaling by signaling the mapping of a sequence of time slots to the associated link-level multicast addresses.

Each wireless terminal (e.g. wireless terminal 101) is notified of assigned link-level multicast addresses as determined by the requested multicast service and the wireless terminal's SNR measurements. Each multicast service corresponds to at least one layer comprising layers $G_1, G_2, \ldots, G_m$, where $G_1$ may be a basic layer (e.g. layer 173 in FIG. 1) and $G_2$ to $G_m$ may be enhancement layers (e.g. layers 171 and 172 in FIG. 1) of the same multicast content (information carried by a data stream). Each layer is associated with a multicast group. Without loss of generality, the importance of layers diminishes from $G_1$ to $G_m$. In other words, layers with lower indices are more essential for constructing image and audio components. The bandwidth requirements for $G_1$ to $G_m$ correspond to $B_1$ to $B_m$, respectively.

$R_i$ is the data rate during a time slot as determined by the SNR measurement that is associated with the $i^{th}$ wireless terminal. Without loss of generality, the wireless terminals can be ordered according to the values of the associated SNR measurements. If there are n wireless terminals ($MS_1$ to $MS_n$), then:

$$R_1 \leq R_2 \leq R_3 \leq \ldots \leq R_n \qquad \text{EQ. 1}$$

where $R_i$ is the allowable data rate (i.e., the maximum data rate that wireless terminal 101 can reliably receive) for the $i^{th}$ wireless terminal. It is assumed that the allowable data rate varies slowly with respect to the time duration of a time slot.

The allowable data throughput for the $i^{th}$ wireless terminal is the sum of bandwidths corresponding to the layers that the $i^{th}$ wireless terminal can reliably receive. Thus, the allowable data throughput for the $i^{th}$ wireless terminal is $T_1+T_2+\ldots+T_i$, where $$B_1+B_2+\ldots+B_{m1} \leq T_1$$

$$B_{m1+1}+B_{m2+2}+\ldots+B_{m2} \leq T_2$$

$$B_{m(i-1)+1}+B_{m(i-1)+2}+\ldots+B_{mi} \leq T_i$$

Each sum corresponds to a link-level multicast address in which the associated layers are transmitted during a time slot. The net data rate that the $i^{th}$ wireless terminal ($MS_i$) can receive data is given by:

$$T_i = a_i * R_i,$$

where $a_i$ is the fraction of time slots that are allocated to $MS_i$. For example, if a simple round robin scheduling scheme is used to assign time slots to different wireless terminals, then $a_i = 1/n$ for all i.

The layers that the ordered wireless terminals can receive (as determined by the maximum data rate that can be reliably received by a wireless terminal and the total bandwidth for layers that are assigned to the wireless terminal) are:

first wireless terminal $(MS_1) \Leftrightarrow G_1, G_2, \ldots, G_{m1}$ second wireless terminal $(MS_2) \Leftrightarrow G_1, G_2, \ldots, G_{m1}, G_{m1+1}, G_{m1+2}, \ldots G_{m2}$ $i^{th}$ wireless terminal$(MS_i) \Leftrightarrow G_1, \ldots, G_{mi}$ Link-level multicast addresses are assigned corresponding to appropriate groups of layers, and consequently node 207 signals the wireless terminals (e.g. wireless terminal 101) about the assigned link-level multicast addresses. (One or more IP multicast layers can be transmitted during a time slot.) In the exemplary embodiment, a link-level multicast address is signaled to wireless terminals $MS_1$ to $MS_n$. If data is transmitted to link-level multicast address $L_1$ during a time slot, the maximum transmission rate is $R_1$. Because of the ordering of $R_i$'s in EQ. 1, all wireless terminals $MS_1$ to $MS_n$ can reliably receive the data. A link-level multicast address $L_2$ is signaled to wireless terminals $MS_2$ to $MS_n$. This indicates that all wireless terminals $MS_2$ to $MS_n$ should process data transmitted to link-level multicast address $L_2$. If data is transmitted to link-level multicast address $L_2$ during a time slot, the maximum transmission rate is $R_2$.

Because of the ordering in EQ. 1, it is always possible for all wireless terminals $MS_2$ to $MS_n$ to reliably receive the data. However, $MS_1$ does not process the data that is addressed to $L_2$ because transmission rate $R_2$ may be too high for $MS_1$ to reliably receive the data. Precluding $MS_1$ from receiving $L_2$ also avoids the usage of battery power for processing data that may not be correctly decoded by $MS_1$. This procedure is continued for the remaining n ordered wireless terminals as indicated in EQ. 1. In other words, all wireless terminals that are instructed to process a time slot can reliably receive (i.e. within the target PER) the data as determined by the SNR measurements associated with each of the wireless terminals.

The ordering of wireless terminals can be illustrated in the context of FIG. 1. In the example, the bandwidth that is associated with layer 173 is 16 kb/s, the bandwidth associated with layer 172 is 150 kb/s, and the bandwidth associated with layer 171 is 1000 kb/s. The total bandwidth to receive layers 171, 172, and 173 is 1116 kb/s (1000+150+16). The total bandwidth to receive layers 172 and 173 is 166 kb/s. (In order to receive layers 171, 172, and 173, wireless terminal 101 should measure a SNR greater than 3 dB corresponding to Table 1.) In the example, the corresponding SNR measurements are (in increasing order):

wireless terminal 151 → −11.0 dB wireless terminal 161 → −5.0 dB wireless terminal 162 → −4.0 dB wireless terminal 101 → 4 dB In the example, wireless terminals 161 and 162 are grouped together because both wireless terminals (161 and 162) can reliably receive layers 172 and 173 but cannot reliably receive layer 171.

Packets are scheduled from different layers over different time slots in accordance with the above process. Thus, $$G_1, \ldots, G_{m1} \rightarrow L_1$$

$$G_{m1+1}, \ldots, G_{m2} \rightarrow L_2$$

$$G_{m(i-1)+1}, \ldots, G_{mi} \rightarrow L_i$$

Transmission over wireless channel 102 is scheduled as follows. If a time slot is allocated to wireless terminal $MS_i$, the transmission during that time slot is addressed to link-level multicast address $L_i$. The transmission is also received by wireless terminals $MS_{i+1}, \ldots, MS_n$ because wireless terminals are ordered by SNR measurements, i.e. $MS_{i+1}$ has a larger SNR measurement than does $MS_i$. (In other words, if $MS_i$ is able to receive at a given data rate, then $MS_{i+1}$ is also able to receive at the given data rate.) The IP packet transmitted during this time slot is associated with the IP multicast layers that are mapped to $L_i$. Of course, if a wireless terminal does not request a particular layer, even though the wireless terminal can reliably receive the transmission as determined by the above procedure, then the wireless terminal is not instructed about the associated link-level multicast address.

With a variation of the exemplary embodiment, the scheduling of packets may consider the QoS levels that are associated with $MS_1$ to $MS_n$. For example, the service provider may attempt to deliver packets to a group of wireless terminals (such as $MS_1$ to $MS_n$) in which a time delay or a variation of the time delay (typically referred as time jitter) has an upper limit set by the service provider.

The measured SNR at a wireless terminal $MS_i$ can change with user mobility. Thus, the ordering of wireless terminals can change with time, and consequently the above process must be updated accordingly. Moreover, wireless terminal $MS_j$ may wish to unsubscribe or subscribe to multicast services.

Figure 4:
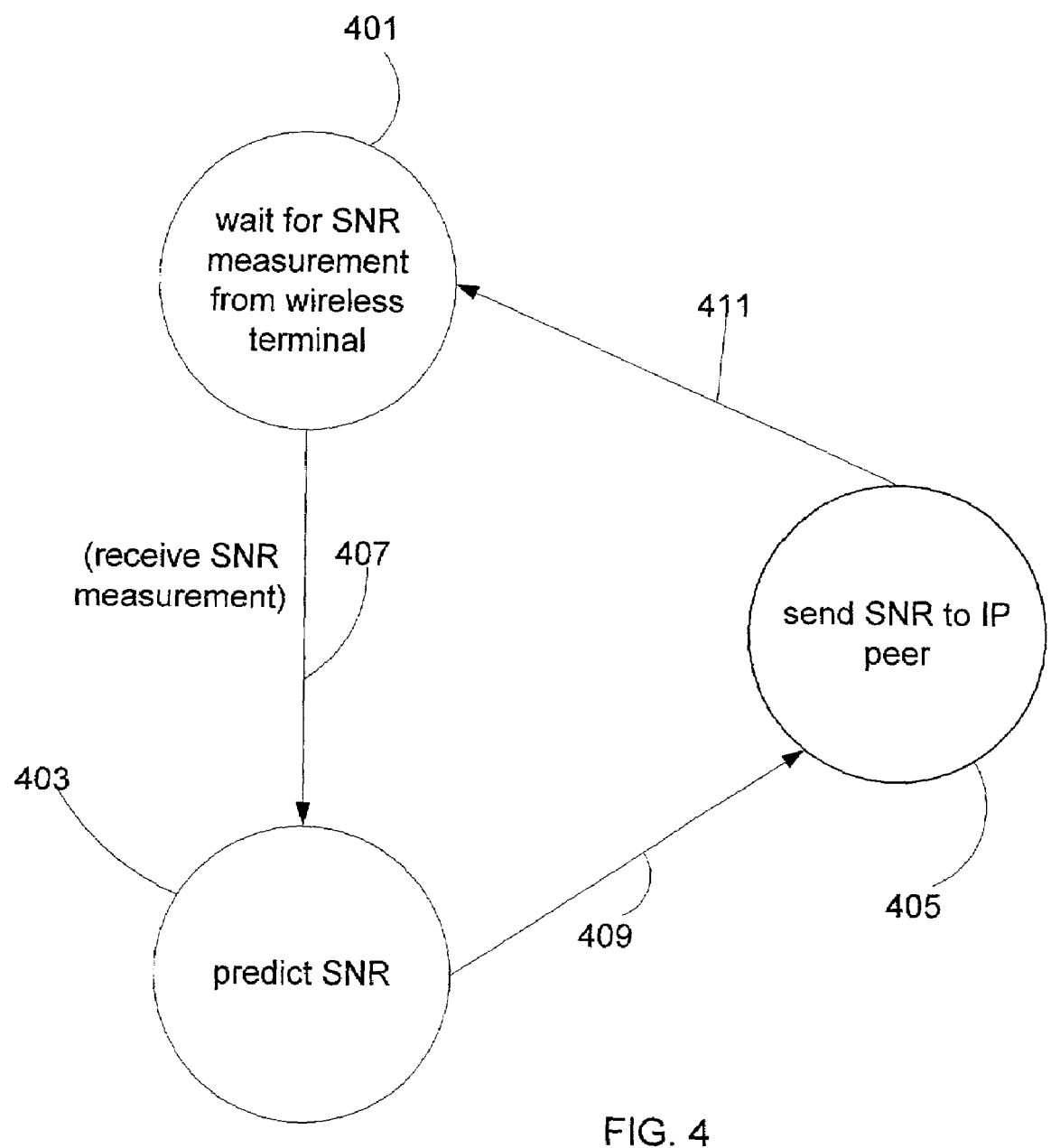
FIG. 4 shows a state diagram for predicting a signal to noise ratio of a received signal in accordance with an embodiment of the invention.

As an enhancement to the scheme described above, FIG. 4 shows a state diagram for predicting a SNR of a received signal at wireless terminal 101 in accordance with the present invention. In the exemplary embodiment, node 207 collects SNR measurements obtained from wireless terminal 101 through base station 105 and data link 225. By predicting the SNR, wireless system 200 can better provide multicast services because wireless system 200 can anticipate dynamic radio propagation characteristics when packets are actually received by wireless terminal 101.

In a state 401, node 207 obtains SNR measurements from wireless terminal 101 through wireless channel 102 and data link 225 on a repetitive basis. Upon receiving a new SNR measurement (corresponding to a trigger 407), node 207 determines predicted SNR ($SNR_p(t)$) in a state 403. The exemplary embodiment utilizes exponential averaging:

$$SNR_p(t)=a*SNR_p(t-1)+(1-a)*SNR(t) \qquad \text{EQ. 2}$$

where SNR(t) is a SNR measurement from wireless terminal 101, and parameter a is determined according to local radio propagation characteristics. (EQ. 2 is referred as "exponential averaging" because the corresponding impulse function of the associated filter is an exponential function.) Variations of the embodiment can utilize other forms of averaging.

With a variation of the exemplary embodiment, movement detection may be incorporated into determining $SNR_p(t)$. As a variation of the embodiment, the SNR is predicted by:

$$SNR_p(t)=a*SNR(t)+b*SNR_p(t-1)+c*f(v,SNR(t)) \qquad \text{EQ. 3}$$

where a, b, and c are parameters that are dependent on local radio propagation characteristics, v is the estimated velocity of wireless terminal 101, and f is a function determined according to local radio propagation characteristics. In Equation 3, the predicted SNR is dependent upon the previously predicted SNR ($SNR_p(t-1)$), the current SNR measurement (SNR(t)), and the movement (velocity, which includes speed and direction) of the wireless terminal as related by the function f(v,SNR(t)). In the embodiment, movement is determined by changes in the roundtrip propagation delay encountered on wireless channel 102. (If the wireless terminal is moving towards the serving base station, the SNR will tend to increase with time. On the other hand, if the wireless terminal is moving away from the serving base station, the SNR will tend to decrease with time. Also, the function f(v,SNR(t)) may be dependent on the SNR because time changes of the SNR are more pronounced during fades corresponding to small SNR measurements.

After determining $SNR_p(t)$, a state 405 is entered. Node 207 sends the measured SNR and predicted SNR to IP peer 211 through a data link 229. With a variation of the exemplary embodiment, node 207 notifies IP peer 211 about layers that can be currently supported by wireless channel 102. State 401 is re-entered in preparation to obtain a subsequent SNR measurement from wireless terminal 101.

Figure 5:
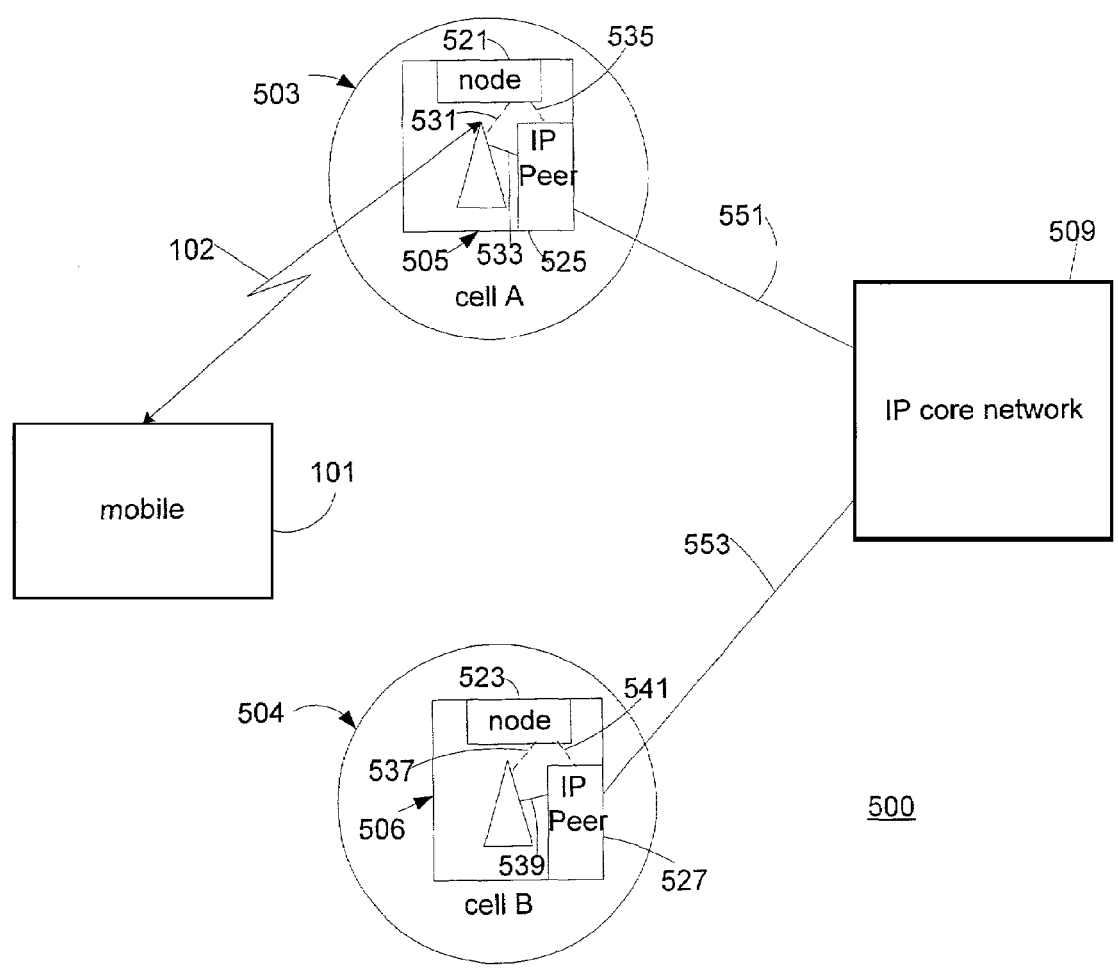
FIG. 5 shows an architecture of a wireless communications system in which a base station implements an IP router in accordance with an embodiment of the present invention.

FIG. 5 shows an architecture of a wireless communications system 500 in which base stations 505 (serving a cell 503) and 506 (serving a cell 504) implement an IP router in accordance with an embodiment of the present invention. The architecture shown in FIG. 5 is a variation of the architecture shown in FIG. 2. In FIG. 5, node functionalities 521 and 523 (logically represented as 207 in FIG. 2) and an IP peer functionality 525 and 527 (logically shown as 211 in FIG. 2) are implemented by base stations 505 and 506. The architecture in FIG. 5 can be utilized in an all-IP network. Data links 531 and 537 correspond to data links 225 and 227 in FIG. 2. Data links 535 and 541 correspond to data link 229. Base stations 505 and 506 connect to upstream routers in an IP core network 509 through IP links 551 and 553. A data link 533 (corresponding to a data link 539 in base station 506) provides IP connectivity for transmission over wireless channel 102. Data links 533 and 539 can be routed through nodes 521 and 523, respectively.

Figure 6:
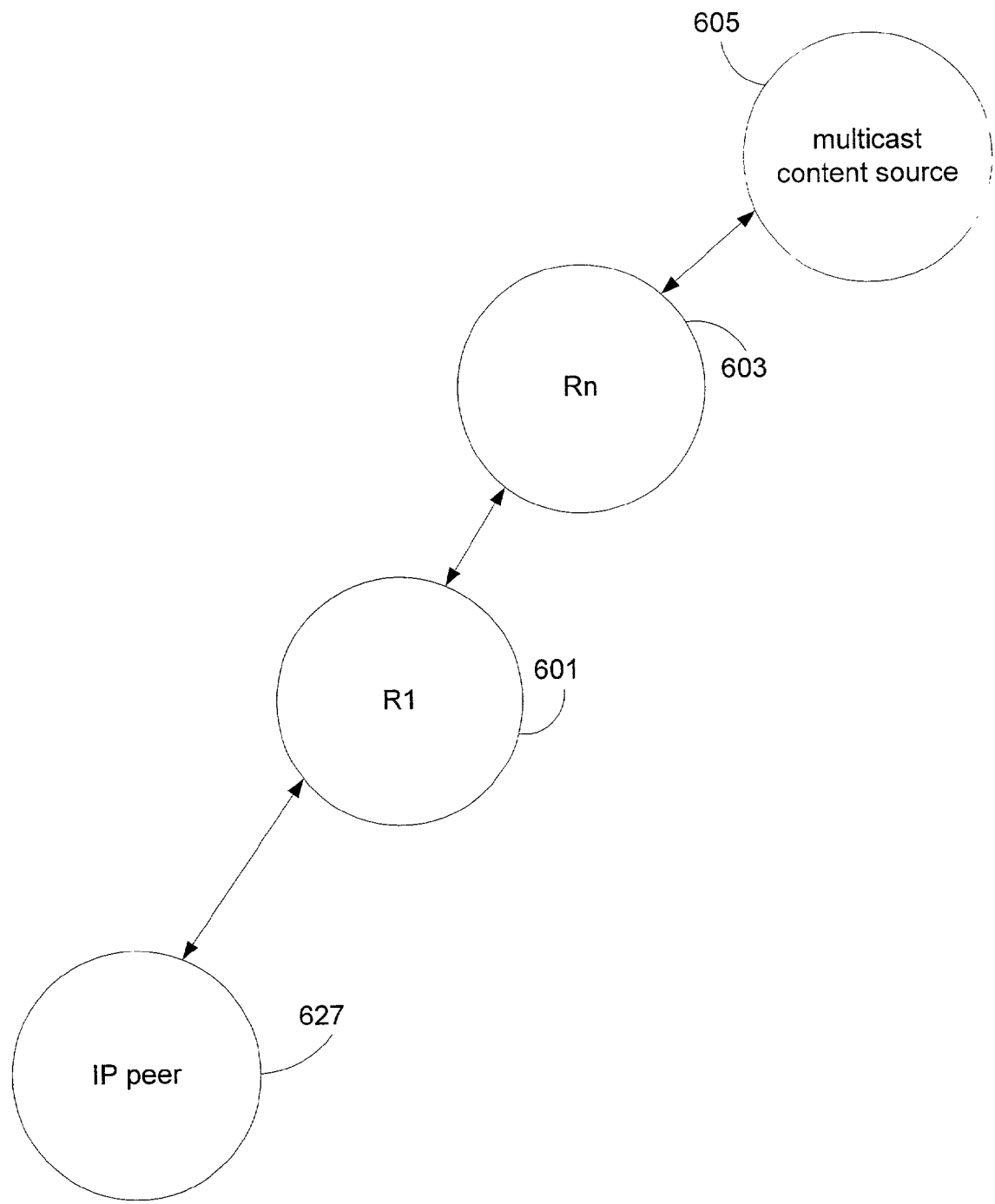
FIG. 6 shows an IP core network configuration in accordance with an embodiment of the present invention.

FIG. 6 shows an IP core network configuration in accordance with an embodiment of the present invention. IP peer 627 corresponds to IP peer 211 in FIG. 2 and to IP peer 525 and IP peer 527 in FIG. 5. Upstream router RI 601 and upstream router 603 are within IP core network 209 in FIG. 2 and IP core network 509 in FIG. 5. Multicast content source 605 provides the source of a multicast stream that is transmitted to wireless terminals 101, 151, 161, and 162 over wireless channel 102.

Figure 7:
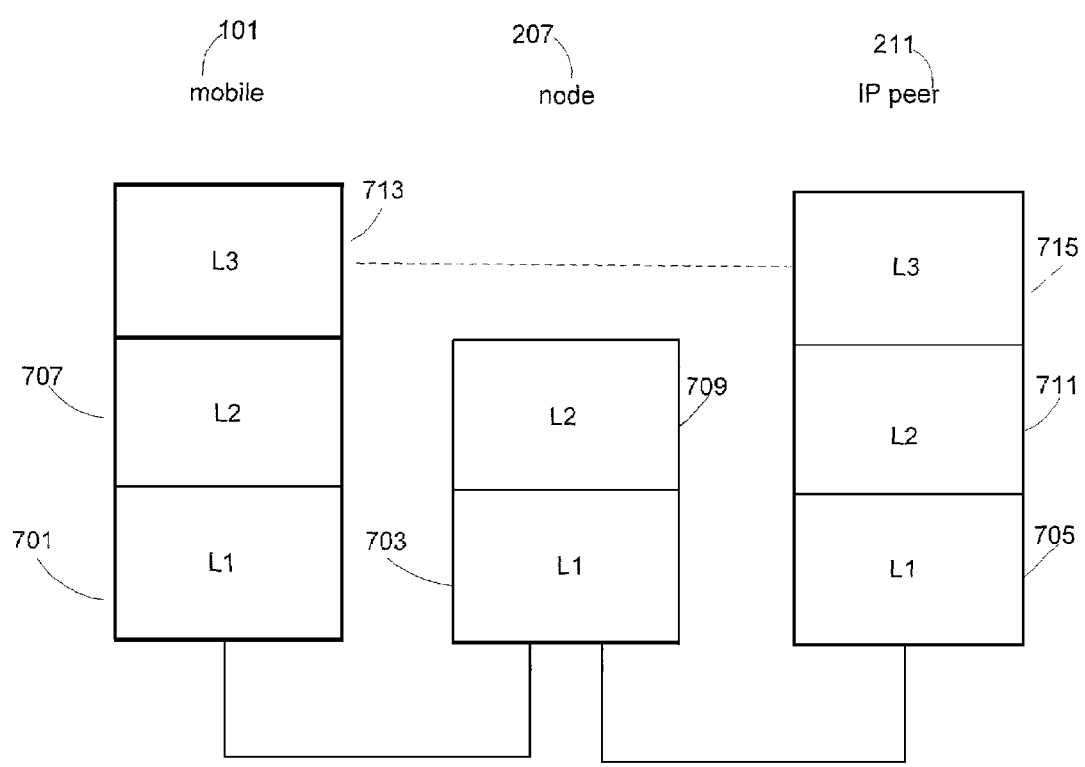
FIG. 7 shows a protocol layering diagram corresponding to FIGS. 1 and 2 in accordance with an embodiment of the present invention.

FIG. 7 shows a protocol layering diagram corresponding to FIGS. 2 and 5 in accordance with embodiments of the present invention. Wireless terminal 101, node (207, 521, or 523), and IP peer (211, 525, or 527) physically communicate with each other at L1 physical layers 701, 703, and 705. As specified by the OSI reference model, higher level OSI layers reside on top of the physical layer. (As a point of clarification, the term "layers" in reference to the OSI model is not the same as the term "layers" in reference to the transmission of the multicast content.) L2 layers (data link layer) 707, 709, and 711 utilize the physical layers L1 701, 703, and 705 in order to detect and correct message errors. L3 layers (network layer) 713 and 715 are situated on top of L2 layers 707 and 711, respectively. L3 layers 713 and 715 determine how data is transferred and address routing within and between individual networks. The Internet protocol (IP) corresponds to the network layer (L3 layers 713 and 715).

Figure 8:
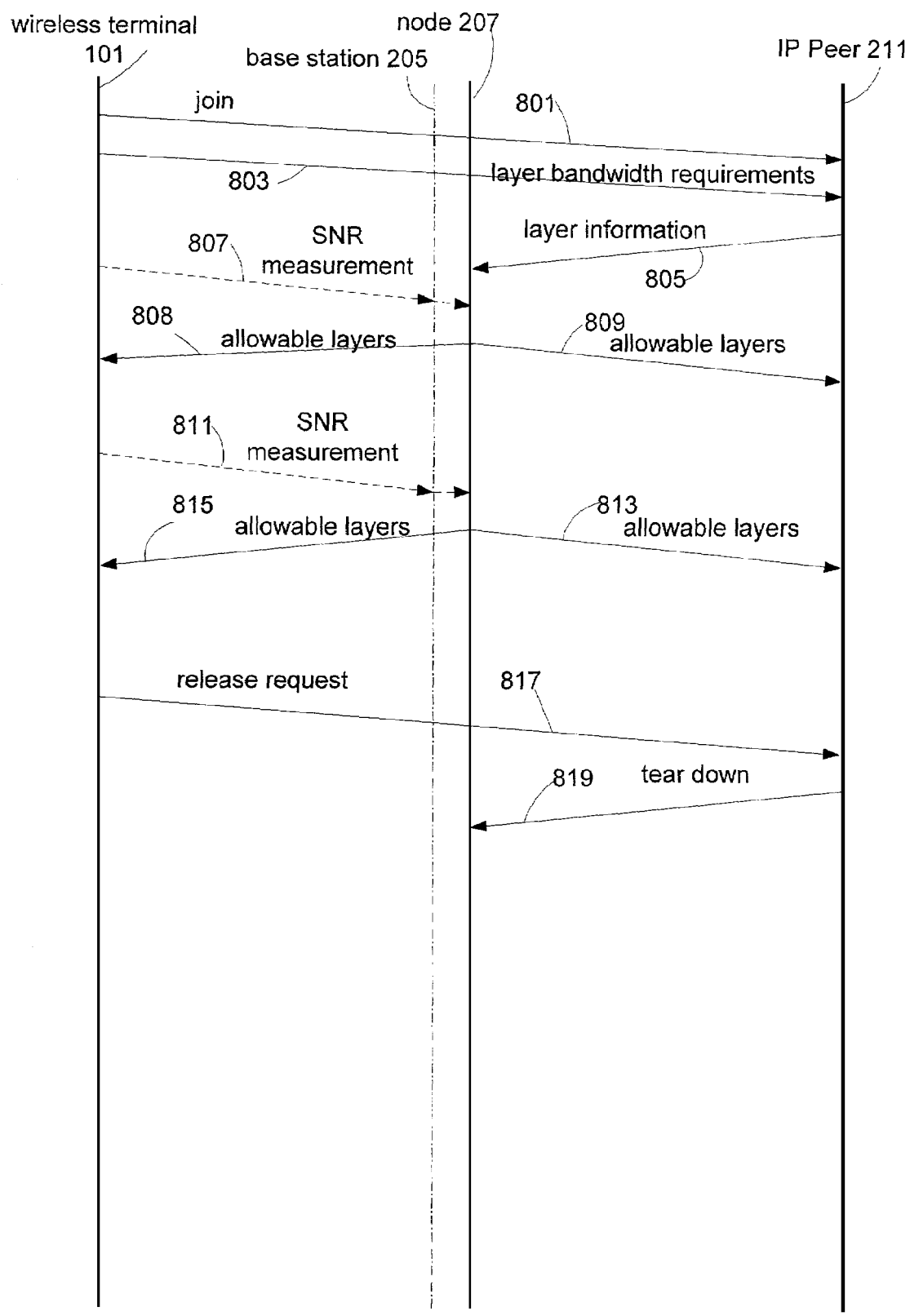
FIG. 8 is a signaling scenario for the wireless communications systems in FIGS. 2 and 5.

FIG. 8 is a signaling scenario for wireless communications systems 200 and 500 shown in FIGS. 2 and 5. Wireless terminal 101 sends message 801 to inform IP peer 211 that wireless terminal 101 (as initiated by the user of the wireless terminal) wants to join a multicast session that is associated with at least one layer. Each layer corresponds to a multicast group. Message 801 may be divided into a sequence of messages such as when using Internet Group Management Protocol (IGMP) messages. Even though FIG. 8 shows a connection between wireless terminal 101 and IP peer 211, all messages between wireless terminal 101 to IP peer 211 can be transported through base station 105 in order to interface with wireless channel 102.

In addition to message 801, wireless terminal 101 sends bandwidth requirements for each layer to the IP peer in message 803. Information about the bandwidth requirements are contained in memory of wireless terminal 101 and may be known a priori or may be obtained from a broadcast message that is transmitted over wireless channel 102. In the exemplary embodiment, the bandwidth requirements are contained in an extension of the IGMP message, although other embodiments can use a message or can utilize a data structure that associates bandwidth requirements with each layer.

IP peer 211 stores received information regarding membership to multimedia groups and the associated bandwidth for the layers. Message 803 may be physically separate from message 801 or may be physically included with message

801. With a variation of the exemplary embodiment, messages 801 and 803 comprise a consolidated message including IP addresses of multicast groups as well as associated bandwidth requirements. With another variation of the exemplary embodiment, a data structure is maintained at IP peer 211. The data structure associates bandwidth requirements with each multicast group (layer). The data structure can be provisioned with a priori information by the service provider or can be constructed with bandwidth information that is obtained from wireless terminals requesting multicast services.

IP peer 211 sends message 805 to inform node 207 about bandwidth requirements for each layer and to provide information about wireless terminal 101 joining the multicast session. Thus, node 207 obtains knowledge about the bandwidth requirements of each layer and about the set of wireless terminals (e.g. wireless terminal 101) that are participating in the multicast session. Subsequently, wireless terminal 101 sends a SNR measurement of the received signal on wireless channel 102 by sending message 807 through base station 105 to node 207.

Based upon the information obtained by node 207 in SNR measurement 807, node 207 determines the number of layers that wireless terminal 101 can reliably receive over wireless channel 102. (The procedure for determining the number of layers is described above.) (Variations of the embodiment may utilize other measurements, in lieu of SNR measurements, that are indicative of the radio propagation conditions.) Node 207 sends the number of layers to IP peer 211 in message 809. (Each layer is associated with a corresponding transmission bandwidth. The total bandwidth is the sum of corresponding bandwidths of each assigned layer. The total bandwidth should not exceed the maximum data rate corresponding to the measured SNR.) The transmitted signal transports streaming data for the multicast session and comprises at least one layer, with each layer corresponding to a link-level multicast address. In a variation of the exemplary embodiment, node sends the number of layers to wireless terminal 101 by sending message 808 through base station 105 in order that a display at wireless terminal 101 can be updated to show the user about the current status of the multicast service. The display will be discussed in greater detail in conjunction with FIG. 14.

IP peer 211 utilizes information regarding the number of layers that can be supported on wireless channel 102 in order to control the rate of associated traffic through IP core network 209. With the exemplary embodiment, the data rate through IP core network 209 is adapted according to the data rate that wireless channel 102 can support. With varying radio propagation characteristics during the multicast session, layers can be added or dropped in response to SNR measurements from the wireless terminals that are participating in the multicast session. In the example shown in FIG. 1, if wireless terminal 101 experiences a degradation of wireless channel 102 (such as going through a tunnel), wireless terminal 101 may not be able to reliably receive a sufficiently high transmission rate on wireless channel 102. If the current maximum data rate is less than the required transmission rate to support layers 171, 172, and 173 but greater than the required transmission rate to support layers 172 and 173, then wireless terminal 101 is signaled by base station 205 (corresponding to message 815) to process data only for the corresponding link-level multicast addresses that are associated with layers 172 and 173.

If none of the wireless terminals can reliably receive a layer, then IP peer 211 can instruct an upstream IP router that the associated data (for the associated multicast group) can pause. Similarly, when at least one of the wireless terminals can reliably receive a layer over wireless channel 102, then the associated data stream can resume for the multicast group. The process for controlling the data flow through IP core network 209 is explained in more detail in conjunction with FIG. 10.

Throughout the multicast session, wireless terminal 101 updates node 207 about SNR measurements of wireless channel 102 by sending message 811. Node 207 updates IP peer 211 and wireless terminal 101 about the number of layers can be received over wireless channel 102 with messages 813 and 815, respectively. The updating by wireless terminal 101 can be initiated by a number ways. In the exemplary embodiment, the message 811 occurs on a periodic basis according to a timer at wireless terminal 101; however, an alternative embodiment can utilize a threshold detector in which wireless terminal 101 sends message 811 only if the SNR measurement is below a threshold value.

If wireless terminal 101 wishes to leave the multicast session, wireless terminal 101 sends message 817 to IP peer 211. The appropriate membership information is updated. The tear down on the IP level can be executed either explicitly or implicitly. When explicitly executed, as shown in the exemplary embodiment, a dedicated message 819 is sent to tear down the connection for wireless terminal 101. (However, the data stream can continue for the remaining wireless terminals that are connected to the multicast session.) With implicit execution, wireless terminal 101 sends an IGMP leave message with the multicast group that is associated with the most significant layer of information, thus signifying that the connection is being terminated for wireless terminal 101. In such a case, IP peer 211 is aware of the semantics of the layers, i.e., which layer is the most significant for the multicast session.

Figure 9:
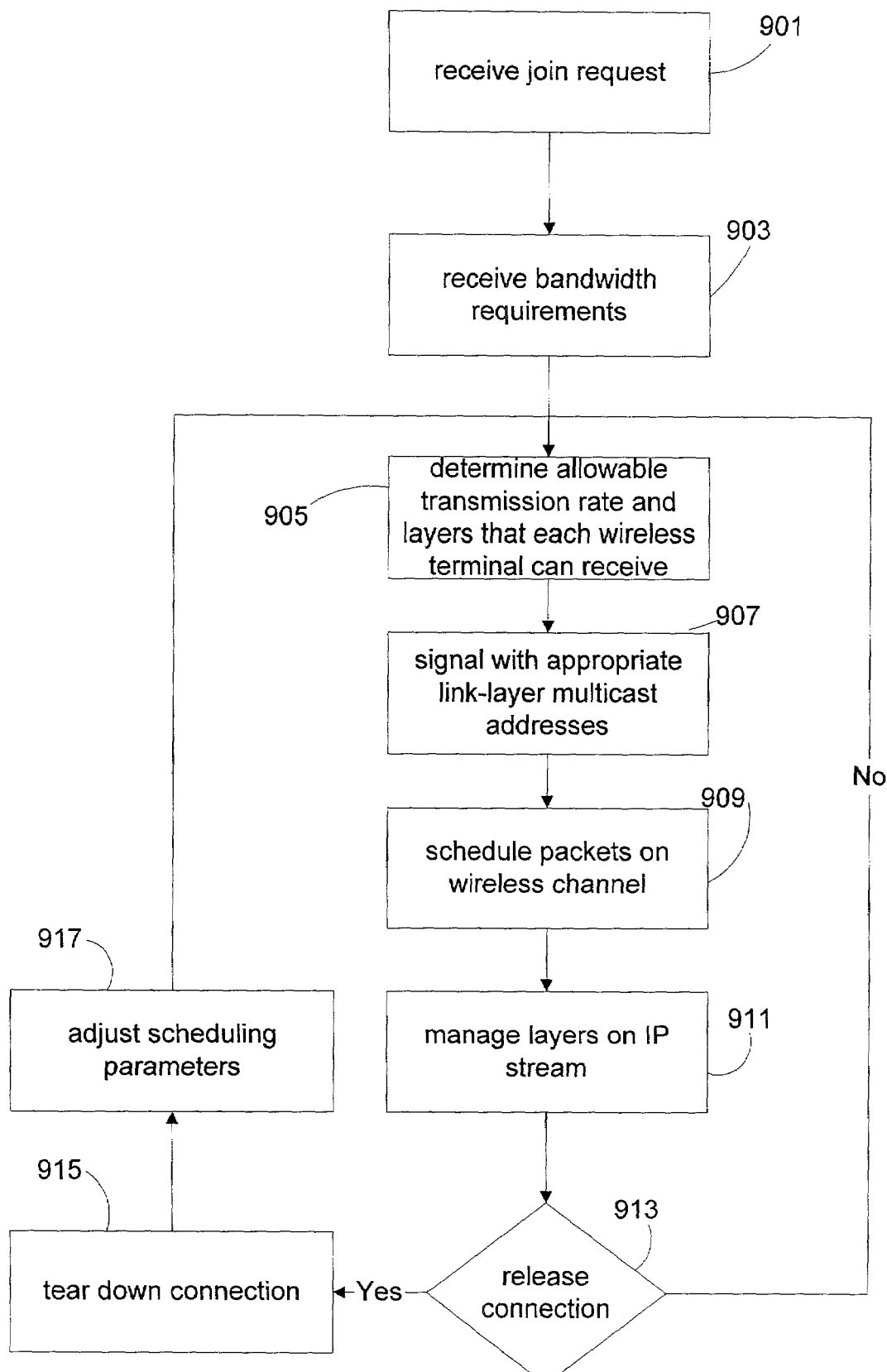
FIG. 9 shows a flow diagram for controlling a transmission for multicast services in accordance with an embodiment of the present invention.

FIG. 9 shows a flow diagram for controlling a transmission for multicast services corresponding to the signal scenario that is shown in FIG. 8 and in accordance with an embodiment of the present invention. In step 901, wireless terminal 101 wishes to join a multicast session and sends a request to IP peer 211 (corresponding to message 801 in FIG. 8). In step 903, IP peer 211 receives bandwidth requirements from wireless terminal 101 (corresponding to message 803 in FIG. 8). In step 905, node 207 receives a SNR measurement (corresponding to messages 807 and 811 in FIG. 8) from wireless terminal 101 through base station 105. In the exemplary embodiment, node 207 predicts the SNR for wireless terminal 101 utilizing Equation 2. Using the predicted SNR for each wireless terminal, node 207 orders a plurality of wireless terminals (including wireless terminal 101) that wish to subscribe to the multicast service in accordance with Equation 1. Node 207 utilizes procedures as previously discussed in order to determine the allowable transmission rate (i.e. the maximum data rate at which a wireless terminal can reliably receive data) and the layers that each wireless terminal can receive. (For example, the $i^{th}$ wireless terminal can receive layers $G_1, G_2, \ldots, G_{mi}$.) If a wireless terminal does not request a layer even though the wireless terminal can reliably receive the layer, the layer will not be assigned to the wireless terminal. In step 907, each of the plurality of wireless terminals is notified of assigned link-level multicast addresses (e.g. $L_1, L_2, \ldots, L_n$) corresponding to the layers that each wireless terminal has requested and that can be received reliably. In step 909, packets from different layers are scheduled on appropriate time slots (transported on wireless channel 102) with each time slot corresponding to a link-level multicast address. In step 911, node 207 sends information about the number of layers (that are being transmitted on wireless channel 102) to IP peer 211 in order that IP peer 211 can manage the IP stream (corresponding to IP link 221 in FIG. 2) in accordance with the layers that are required for the multicast session at a particular instant of time.

In step 913, wireless terminal 101 requests a release connection (corresponding to message 817 in FIG. 8) and tears down the connection for wireless terminal 101 in step 915. In step 917, IP peer 211 notifies node 207 about the release in order that node 207 can determine if scheduling parameters need to be adjusted. For example, if none of the remaining wireless terminals on the multicast session require layer $L_n$ after wireless terminal 101 leaves the multicast session, then node 207 does not need to schedule packets on wireless channel 102 that are associated with the $L_n$ layer. Step 905 and subsequent steps are repeated in order to adjust to dynamic radio propagation conditions on wireless channel 102 during the multicast session.

Figure 10:
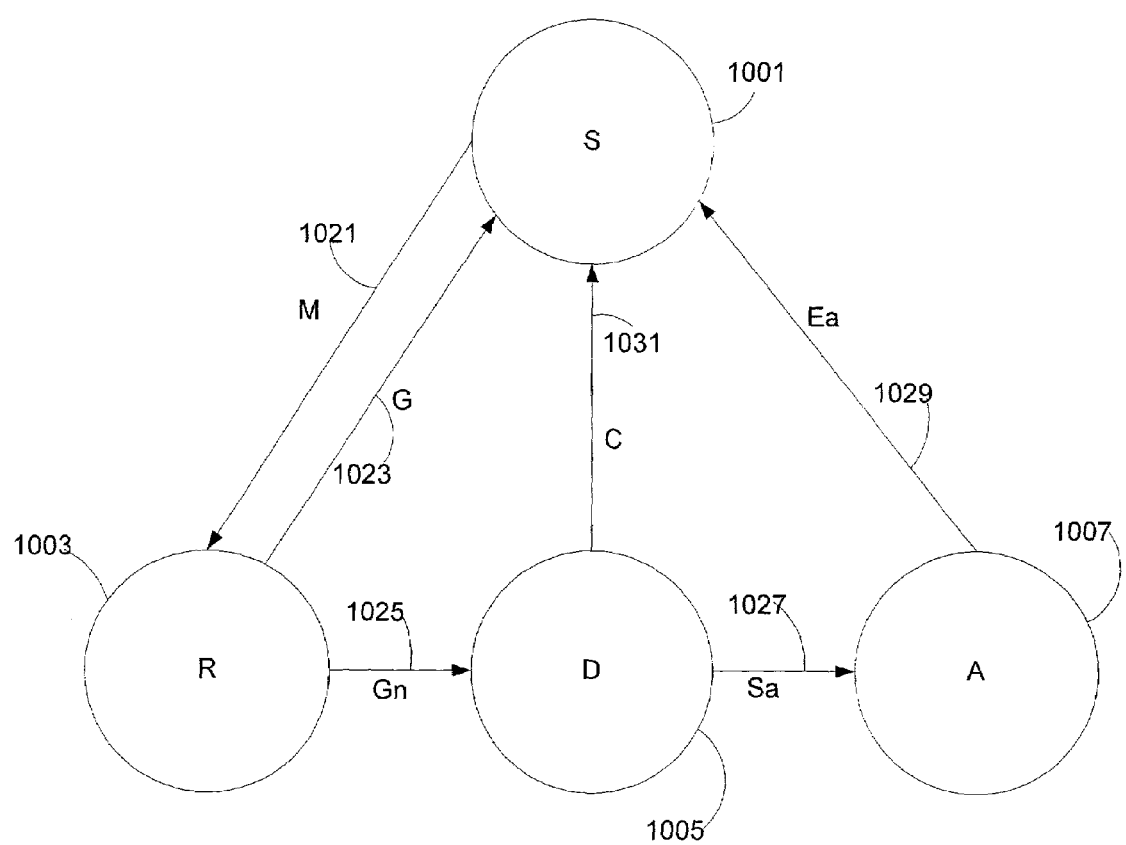
FIG. 10 shows a state machine for a receiver-driven layered multicast process in accordance with an embodiment of the present invention.

FIG. 10 shows a state machine 1000 for a receiver-driven layered multicast (RLM) process in accordance with an embodiment of the present invention. In the exemplary embodiment, the RLM process is implemented at IP peer 211. However, with other embodiments the RLM process can be implemented at other entities such as base station 505 in accordance with the architecture shown in FIG. 5. A state S 1001 corresponds to the normal operation point of the RLM process. Upon reception of message 809 or 813 (shown in FIG. 8), the state machine enters a state R 1003 through a trigger M 1021. The layer configuration is controlled by enabling and disabling of the transmission of layers. If the bandwidth requirements for core IP network 209 are guaranteed (i.e., the delivery of packets by IP network 209 is guaranteed), no further action is needed and state machine 1000 returns to state S 1001 through a transition G 1023. If the bandwidth requirements for core IP network 209 are not guaranteed (i.e., IP packets are transmitted in the best effort mode and thus delivery of packets is not certain), a state D 1005 is entered through a transition Gn 1025. In state D 1005, a decision is made whether to adapt the transmission bandwidth in core IP network 209. The decision is predicated upon balancing the bandwidth requirements of wireless channel 102 with the bandwidth requirements of core IP network 209. (The objective is to transport packets that are associated with multicast layers being transmitted over wireless channel 102 through IP core network 209. However, in order to efficiently utilize IP core network 209, packets that are not associated with the multicast layers being transmitted over wireless channel 102 should not be transported through IP core network 209.) If no bandwidth adaptation is required, state machine 1000 returns to state S 1001 through a transition C 1031. Otherwise, state A 1007 is entered through transition Sa 1027.

In the exemplary embodiment, two IGMP message types are used to adapt the bandwidth of core IP network 209. If packets associated with a multicast group are not to be transmitted over wireless channel 102 (as determined by node 207), then a "PAUSE" message is sent to the upstream router (corresponding to router R1 601 in FIG. 6. The PAUSE message can be passed up further upstream routers (e.g. router Rn 603) towards multicast content source 605 if the further upstream routers do not need to route packets associated with the multicast group. In order to resume the flow of packets that are associated with the multicast group, a "RESUME" message is sent to upstream router R1 601. After completing the adaptation, state S 801 is entered through transition Ea 1029.

Figure 11:
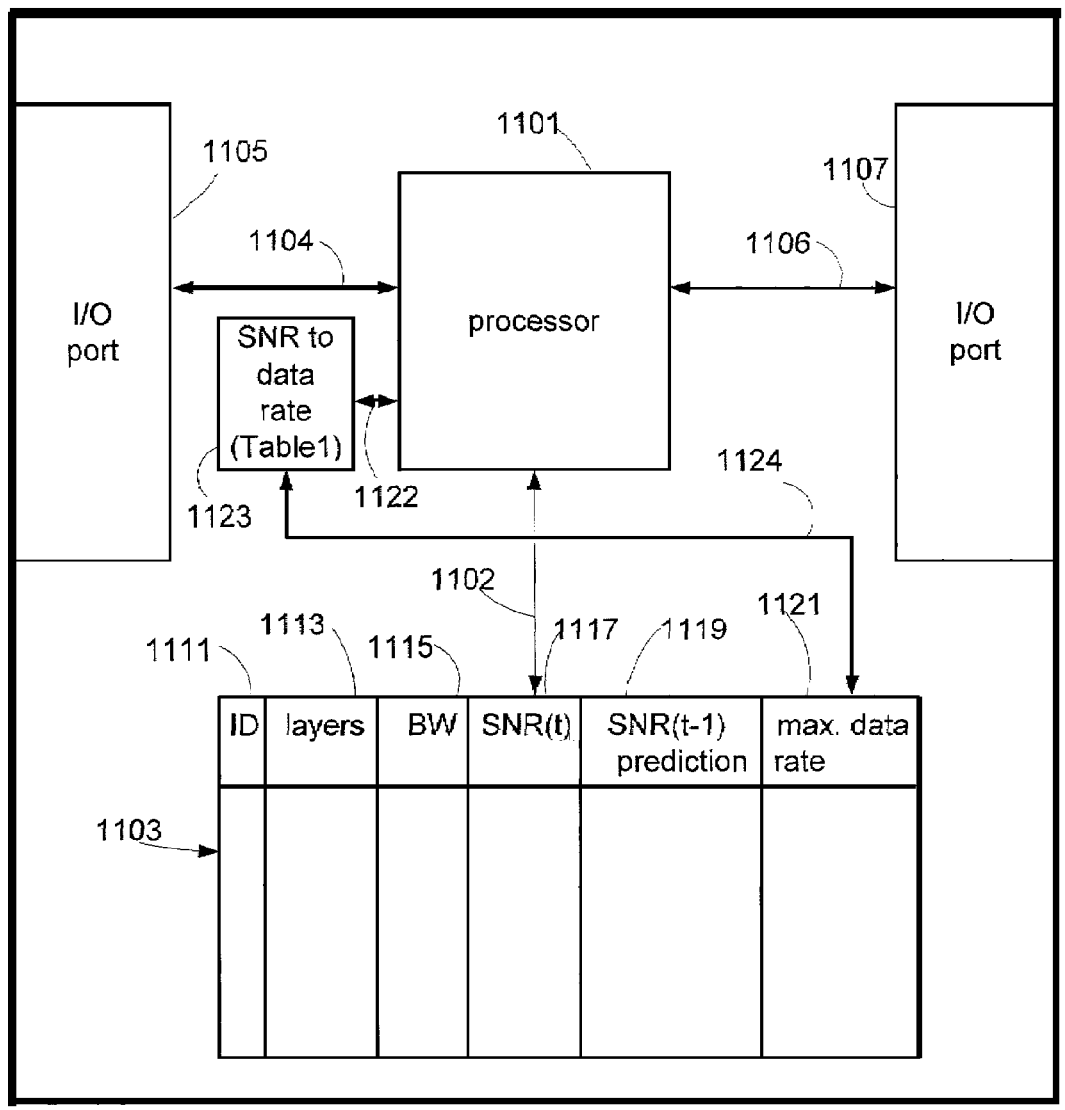
FIG. 11 shows apparatus for a node in accordance with an embodiment of the present invention.

FIG. 11 shows apparatus for node 207 in accordance with an embodiment of the present invention. Node 207 communicates with base station 105 (over link 225) through an input/output (I/O) port 1105. Node 207 communicates with IP peer 211 (over link 229) through an I/O port 1107. In some embodiments, one or more I/O ports could be shared. A processor 1101 receives multicast service requests from wireless terminals (e.g. wireless terminal 101) from IP peer 211 through I/O port 1107 and a link 1106. From a request, processor 1101 obtains an identification of the wireless terminal (e.g. a telephone number or an IP address), the requested layers for the multicast service, and the associated bandwidth requirements for the layers. Processor 1101 stores this information in a memory 1103 through a link 1102 in an ID field 1111, a layers field 1113, and a bandwidth (BW) field 1115, respectively.

Processor 1101 also obtains SNR measurements from wireless terminals in signaling messages (e.g. message 811) through I/O port 1105 and a link 1104. Processor 1101 stores the current SNR measurement from a wireless terminal, as identified by ID field 1111, into a field 1117 and the previous SNR prediction into a field 1119. Processor 1101 determines the maximum data rate from the SNR prediction, which is stored in a field 1121. Processor 1101 utilizes data structure 1123 through links 1122 and 1124 to convert the SNR prediction into the maximum data rate. Processor 1101 updates layers field 1113 according to the maximum data rate that the wireless terminal (associated with ID field 1111) can reliably receive.

Figure 12:
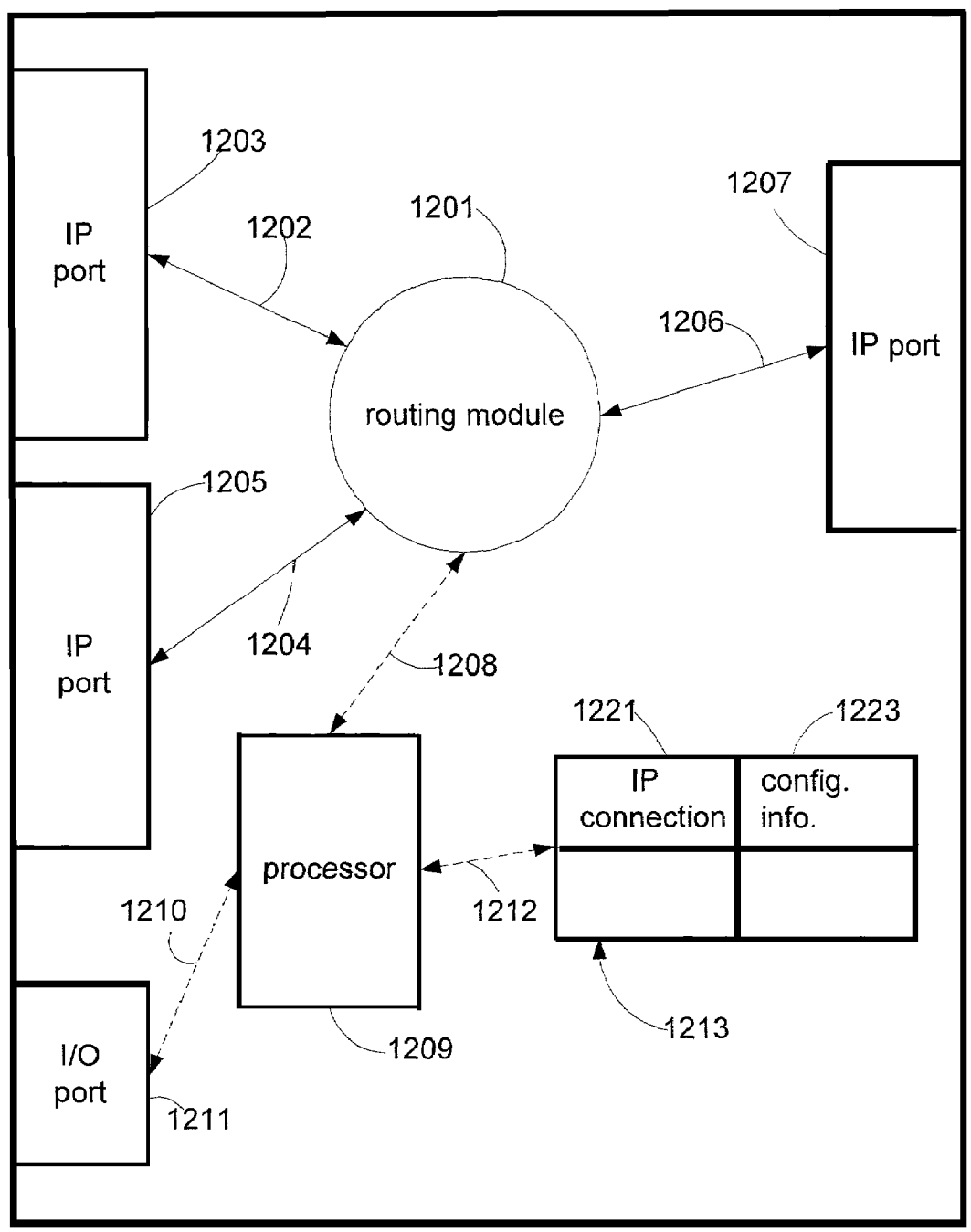
FIG. 12 shows apparatus for an IP peer in accordance with an embodiment of the present invention.

FIG. 12 shows apparatus for IP peer 211 in accordance with an embodiment of the present invention. IP peer 211 connects to IP core 209 through an IP port 1207, to base station 105 (over link 221) through an IP port 1203, and to base station 206 (over link 222) through an IP port 1205. Other embodiments can support other data protocols other than IP. Thus, IP ports 1203, 1205, and 1207 correspond to "data ports." Also, IP peer 211 connects to node 207 (over link 229) through an I/O port 1211. A routing module 1201 directs packets between IP port 1203 and IP port 1207 (though links 1202 and 1206) and between IP port 1205 and IP port 1207 (through links 1204 and 1206) in order to support multicast sessions.

Processor 1209 obtains multicast service requests from wireless terminals through IP ports 1203 and 1205. Each multicast session between a base station and a multicast content source corresponds to a connection. (A connection can support a plurality of wireless terminals that are served by a base station for a multicast service.) Processor 1209 determines configuration information (e.g. the number of layers that are being transmitted by base stations 105 and 206) and stores the information in a memory 1213 in fields 1221, and 1223. Processor 1209 instructs routing module 1201 to control the packet flow through IP core 209 in accordance with the information stored in field 1223. In the exemplary embodiment, routing module 1201 appropriately issues PAUSE and RESUME messages to upstream router 601. Embodiments of the present invention can incorporate the functionality of routing module 1201 into processor 1209.

Figure 13:
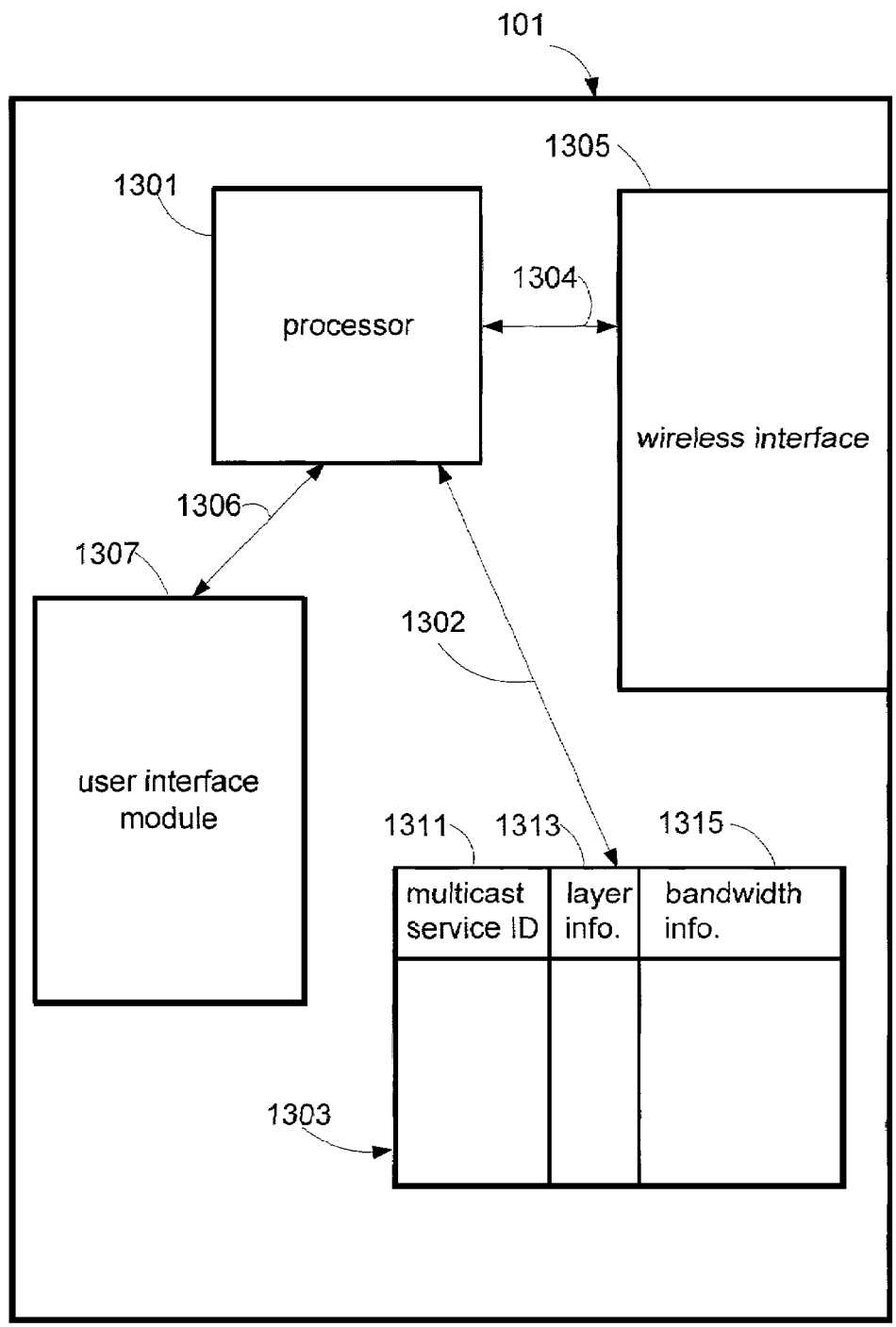
FIG. 13 shows apparatus for a wireless terminal in accordance with an embodiment of the present invention.

FIG. 13 shows apparatus for wireless terminal 101 in accordance with an embodiment of the present invention. Wireless terminal 101 communicates over wireless channel 102 through a wireless interface 1305. Processor 1301 interacts with wireless interface 1305 over a link 1304. Information about a multicast service is stored in a memory 1303 and obtained by processor 1301 through a link 1302. For each multicast service, memory 1303 contains a multicast service identification (field 1311), information about the associated layers (field 1313), and associated bandwidth information (field 1315). In the exemplary embodiment, the information in memory 1303 was previously programmed by a service provider. However, a variation of the embodiment can utilize a user interface module 1307 through a link 1306, processor 1301, and link 1302 to configure memory 1303. With another variation of the embodiment, a base station (e.g. base station 105 and 206) broadcasts multicast configuration information about a multicast service over wireless channel 102. Wireless terminal 101 receives the information through wireless interface 1305. Processor 1301 extracts the information and stores the information into memory 1303.

Figure 14:
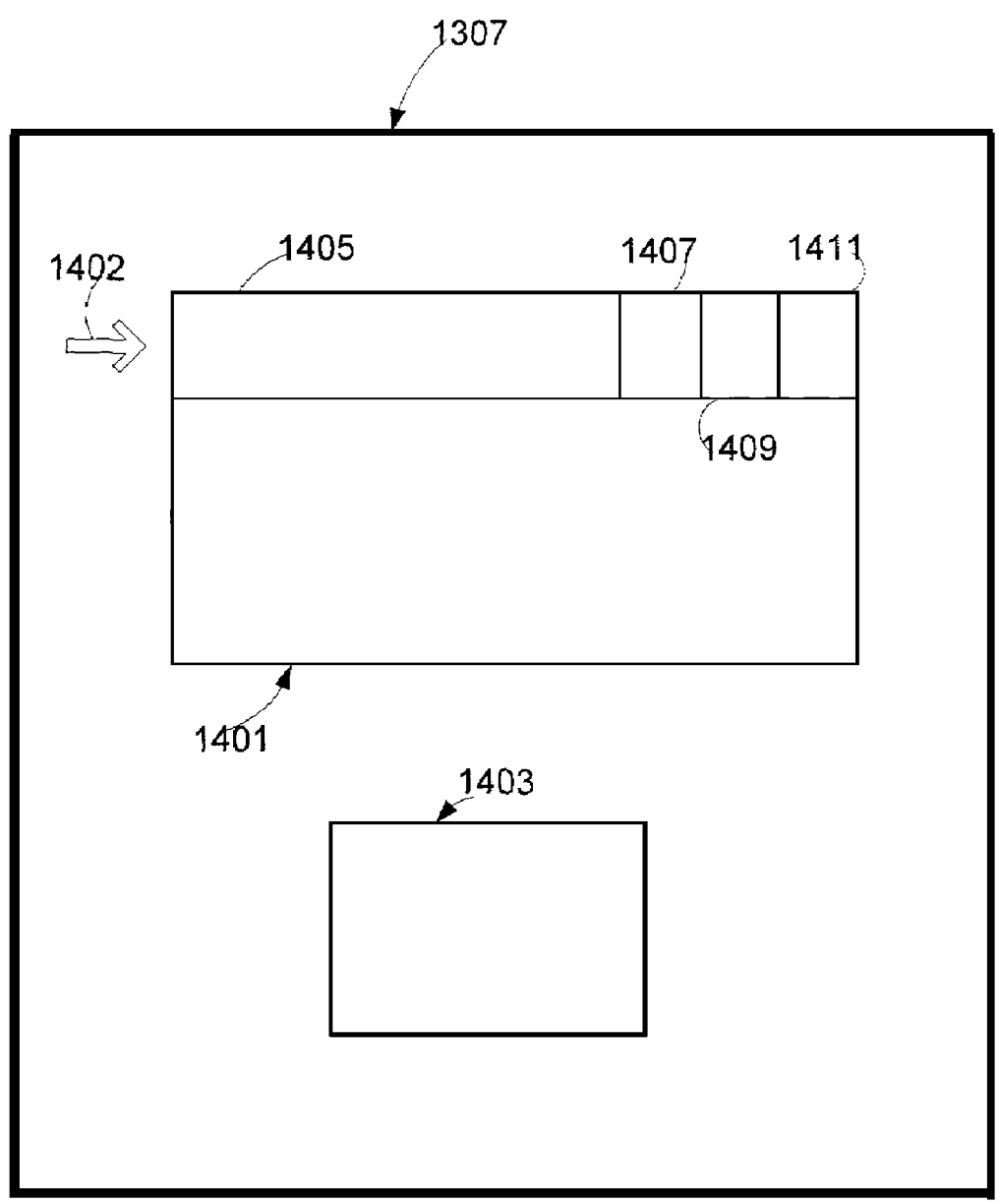
FIG. 14 shows a user interface module at the wireless terminal shown in FIG. 13 in accordance with an embodiment of the present invention.

FIG. 14 shows user interface module 1307 at the wireless terminal shown in FIG. 13 in accordance with an embodiment of the present invention. A user of wireless terminal 101 controls the position of a cursor 1402 through a keypad 1403. The user selects a multicast service corresponding to an entry 1405 (e.g. for news or for movies) by manipulating cursor 1402 through keypad 1403. In the exemplary embodiment, entry 1405 is displayed in an alphanumeric format (e.g. "Gone With The Wind"). An entry 1407 corresponds to a desired level of service. In the exemplary embodiment, entry 1407 is displayed in an alphanumeric format (e.g. "audio," "audio/black and white video," "audio/slow scan color video," and "audio/fast scan color video.") The associated multicast group is transparent to the user by wireless terminal 101 translating the alphanumeric selection to the corresponding multicast group. An entry 1409 displays a minimum level of service. For example, the user may not accept "audio" for a movie multicast. As with entry 1407, the corresponding multicast group address is transparent to the user since wireless terminal 101 does the necessary conversion. An entry 1411 displays the actual level of service that is provided by wireless communications system 200. Node 207 notifies wireless terminal 101 about the number of layers currently being transported over wireless channel 102 by sending message 808 as shown in FIG. 8. Wireless terminal 101 converts the corresponding multicast group address into an alphanumeric format for displaying entry 1411 to the user.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A wireless terminal that supports a multicast service over a wireless channel in a wireless communications system, the wireless terminal comprising:
    a wireless interface;
    a user interface module;
    a memory;
    a processor that connects to the wireless interface in order to communicate over the wireless channel, connects to the user interface module for receiving input from a user of the wireless terminal, and connects to the memory, the processor configured to perform the steps of:
    (a) sending a request that the wireless terminal wishes to join to at least one requested layer corresponding to a multicast group of the multicast service;
    (b) sending bandwidth requirements for the at least one requested layer in response to step (a);
    (c) displaying a list of multicast services and receiving from the user a first selection from the list of multicast services;
    (d) receiving from the user a second selection for a desired level of multicast service for the selected multicast service and displaying the desired level of multicast service, wherein the desired level of multicast service corresponds to a first multicast group address; and
    (e) displaying an actual level of multicast service, wherein the actual level corresponds to information about a number of layers that is currently supported over a wireless channel.

2. The wireless terminal of claim 1, wherein the processor is configured to provide the further steps of:
    (f) sending signal quality information about a received signal over the wireless channel.

3. The wireless terminal of claim 2, wherein the signal quality information comprises at least one signal to noise measurement corresponding to the received signal over the wireless channel.

4. The wireless terminal of claim 1, wherein the processor is configured to perform the further step of:
    (g) sending a notification that the wireless terminal desires to be disconnected from a multicast session.

5. The wireless terminal of claim 1, wherein the processor is configured to perform the further steps of:
    (h) receiving from the user a third selection for a desired level of multicast service for the first selection and displaying a minimum level of multicast service, wherein the minimum level corresponds to a third multicast group address.

6. A method that provides transmission of a multicast session over a wireless channel for a wireless terminal, the method comprising the steps of:
    (a) sending a request that the wireless terminal wishes to join to at least one requested layer corresponding to a multicast group of the multicast service;
    (b) sending bandwidth requirements for the at least one requested layer in response to step (a);
    (c) displaying a list of multicast services and receiving from the use a first selection from the list of multicast services;
    (d) receiving from the user a second selection for a desired level of multicast service for the selected multicast service and displaying the desired level of multicast service, wherein the desired level of multicast service corresponds to a first multicast group address; and
    (e) displaying an actual level of multicast service, wherein the actual level corresponds to information about a number of layers that is currently supported over a wireless channel.

7. The method of claim 6, further comprising the step of:
    (f) sending signal quality information about a received signal over the wireless channel.

8. The method of claim 7, further comprising the step of:
    (g) receiving at least one layer associated with the multicast session in accordance with the signal quality information in step (f).

9. The method of claim 7, further comprising the step of:
(h) sending a notification that the wireless terminal desires to be disconnected from the multicast session.

10. The method of claim 7, wherein the signal quality information comprises at least one signal to noise measurement corresponding to the received signal over the wireless channel.

11. A method in a wireless terminal for displaying information about a multicast service supported by a wireless communications system, the method comprising the steps of:
(a) displaying a list of multicast services and receiving a first selection from the list of multicast services from a user and;
(b) receiving a second selection for a desired level of multicast service for the selected multicast service from the user and displaying the desired level of multicast service in response to step (a), wherein the desired level of service corresponds to a first multicast group address; and
(c) displaying an actual level of multicast service, wherein the actual level corresponds to a number of layers that is currently supported over a wireless channel.

12. The method of claim 11, further comprising the step of:
(d) displaying a minimum level of multicast service in response to step (b), wherein a third selection for a desired level of multicast service for the first selection is received from the user and wherein the minimum level corresponds to a third multicast group address.

13. A computer-readable medium containing instructions for controlling a computer system to provide transmission of a multicast session over a wireless channel in a wireless communications system for a wireless terminal, comprising instructions that perform the steps of:
(a) sending a request that the wireless terminal wishes to join to at least one requested layer corresponding to a multicast group of a multicast service;
(b) sending bandwidth requirements for the at least one requested layer;
(c) sending at least one signal to noise measurement corresponding to a received signal over the wireless channel;
(d) displaying a list of multicast services and receiving from the user a first selection from the list of multicast services;
(e) receiving from the user a second selection for a desired level of multicast service for the selected multicast service and displaying the desired level of multicast service, wherein the desired level of multicast service corresponds to a first multicast group address; and
(f) displaying an actual level of multicast service, wherein the actual level corresponds to information about a number of layers that is currently supported over a wireless channel.

14. The computer-readable medium of claim 13, further comprising instructions that perform the step of:
(g) sending a notification that the wireless terminal desires to be disconnected from the multicast session.

* * * * *